United States Patent [19]

Hirose et al.

[11] Patent Number: 5,781,244
[45] Date of Patent: Jul. 14, 1998

[54] IMAGE SIGNAL PROCESSING APPARATUS

[75] Inventors: Hisataka Hirose; Teruo Hieda, both of Yokohama, Japan

[73] Assignee: Canon Kabushiki Kaisha, Tokyo, Japan

[21] Appl. No.: 589,580

[22] Filed: Jan. 22, 1996

Related U.S. Application Data

[63] Continuation of Ser. No. 170,397, Dec. 20, 1993.

[30] Foreign Application Priority Data

Dec. 25, 1992 [JP] Japan ............... 4-346527
Dec. 25, 1992 [JP] Japan ............... 4-358960

[51] Int. Cl.$^6$ .................................... H04N 5/262
[52] U.S. Cl. .................. 348/561; 348/581; 348/704; 348/240
[58] Field of Search .................. 348/246, 561, 348/562, 581, 704, 239, 240; 382/298, 300

[56] References Cited

U.S. PATENT DOCUMENTS 5,047,857  9/1991  Duffield et al. ............... 348/561
5,223,934  6/1993  Hong ........................... 348/240

*Primary Examiner*—Glenton B. Burgess
*Attorney, Agent, or Firm*—Morgan & Finnegan, L.L.P.

[57] ABSTRACT

In the image signal processing apparatus in this invention, control is carried out in such a manner that an enlarged image signal based on an image signal stored in a memory is produced a predetermined period of time after the image signal was written into the memory, a blanking signal is generated at a predetermined period of time after a further blanking signal included in the image signal applied into the memory occurs, so that during the blanking period occurring in the image signal, the blanking signal is produced, and during periods outside this blanking period, the output is changed over for the enlarged image signal produced from the memory so that the image signal may be enlarged in a stable manner, and the construction and work involved in circuit adjustment may be simple.

2 Claims, 19 Drawing Sheets

○ WHILE READ ADDRESS MOVES A TO A', WRITE ADDRESS MOVES B TO B', AND OUTRUNS THE READ ADDRESS ON THE WAY.

○ WHEN READ ADDRESS IS AT A, AND WRITE ADDRESS IS AT C, THEN READ ADDRESS WILL NOT OUTRUNS THE WRITE ADDRESS.

⇐ IMAGE IN PRECEDING FIELD
⇐ IMAGE IN PRESENT FIELD

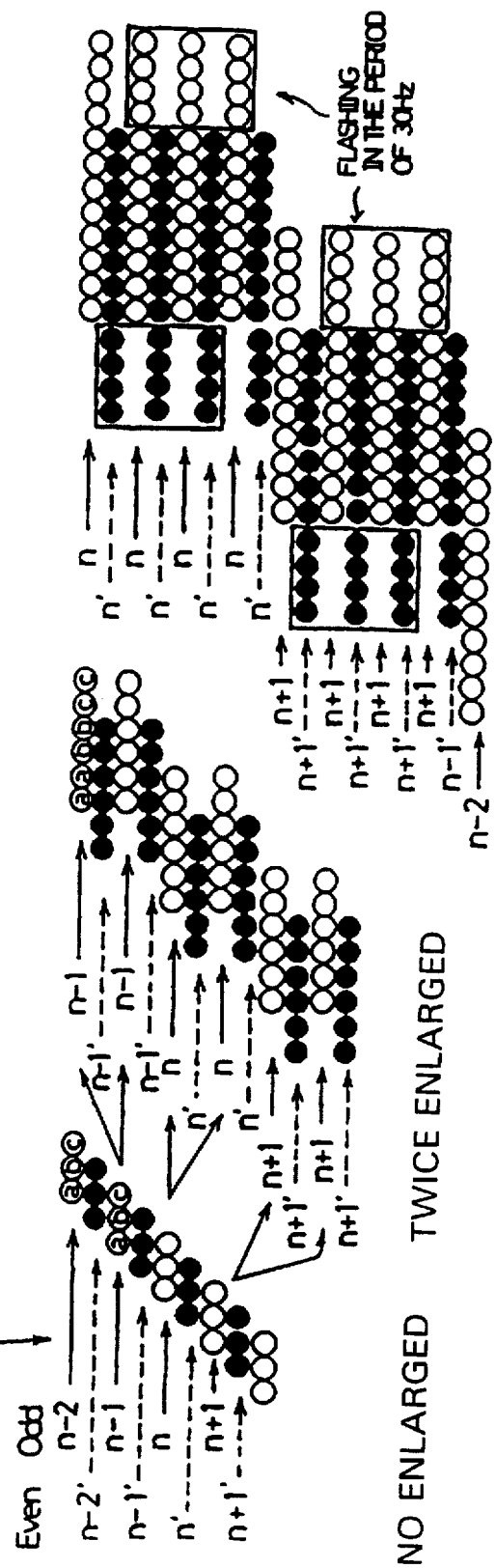
FIG. 4A
PRIOR ART
NO ENLARGED
FIG. 4B
PRIOR ART
TWICE ENLARGED
FIG. 4C
PRIOR ART
FOUR TIMES ENLARGED

FIG. 14A THREE TIMES ENLARGED

FIG. 14B FOUR TIMES ENLARGED

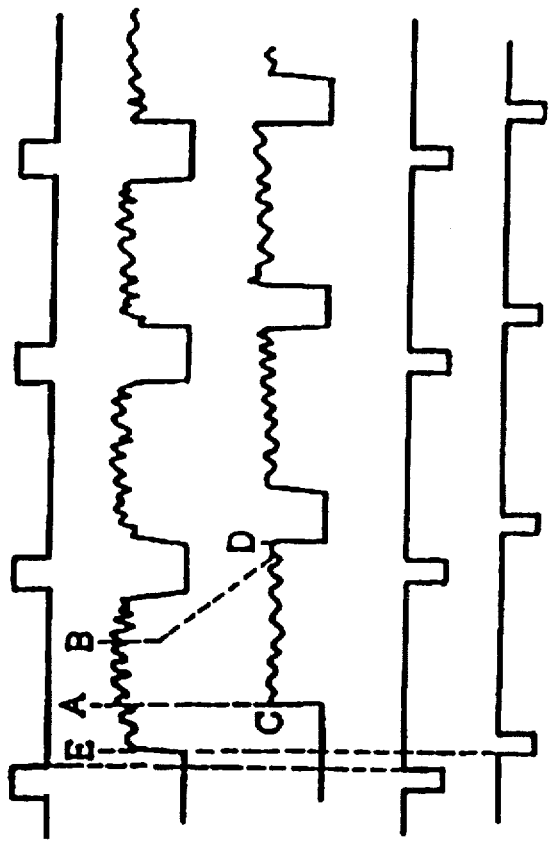
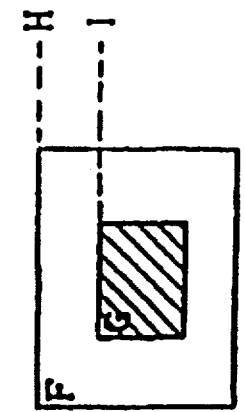
FIG. 19A HD
FIG. 19B NORMAL OUTPUT FROM SWITCH 123
FIG. 19C ENLARGED OUTPUT FROM SWITCH 123
FIG 19D SYNC
FIG. 19E ENLARGED SYNC
FIG. 20

IMAGE SIGNAL PROCESSING APPARATUS

This is a continuation of co-pending application Ser. No. 08/170,397, filed on Dec. 20, 1993.

BACKGROUND OF THE INVENTION

1. Field of The Invention

The present invention relates to an image signal processing apparatus, and more particularly to an apparatus for carrying out enlargement processing on an image.

2. Description of The Related Art

Recently, video effects units which use digital signal processing technology to add special effects known as smoothing, strobe and mosaic effects to picture signals are being manufactured cheaply. As these products are manufactured cheaply, on the whole, they have field memory built-in to the digital signal processing circuit. Image sensing apparatus capable of performing various special effects such as stilling and picture enlargement in combination with this field memory was therefore provided.

For example, a circuit will be described for a first example of the prior art which carries out a special effect known as image enlargement (also known as electron zooming).

With regard to FIG. 1, the synchronizing signal separation circuit 4 separates the horizontal synchronizing signal and the vertical synchronizing signal from the applied image signal and a system clock is generated with respect to these separated synchronizing signals. The write in control circuit 10 then generates a write in address signal for writing the applied image signal into the field memory 8 (hereon referred to as "memory") from these synchronizing signals and the system clock.

The applied image signal is converted into a digital signal by the A/D converter 2 and is written into the memory 8 in accordance with the write in address signal. In this way an image signal for one field is written into the memory 8.

The image signal stored in the memory 8 is read out in accordance with the read out address signal set up for the read out control circuit 12 which depends on the degree of enlargement of the image. After interpolation processing has been carried out by the interporation processor 20, the switch 22 is switched over from the synchronizing signal for the applied image signal to the synchronizing signal portion for the image signal which has undergone image enlargement image processing. This signal is then converted to an analog signal by the D/A converter 26 and produced.

Next, the read out control when the central portion of the picture is enlarged two times will be described.

As is shown in FIG. 2(a), when the picture is to be enlarged by two times, the reading out starts from the point A in the center of the diagram. The items of data are read out from the memory 8 two times. If half of the horizontal image signal part is read out, the same data is then read out again on the next horizontal scan for the image signal part. In this way, the image for the signal for half of the horizontal image signal part of the actual image signal is enlarged by two times in the horizontal direction and the vertical direction. By repeating this kind of control, the central part of the picture is enlarged by two times. The synchronizing signal in this picture is, however, no longer present. The synchronizing signal portion for the image signal which has been enlarged is therefore changed over for the synchronizing signal portion of the applied image signal and this is then produced.

Next, a circuit for a second example of the prior art will be described using FIG. 3.

With regard to FIG. 3, the synchronizing signal separation circuit 4 separates the horizontal synchronizing signal and the vertical synchronizing signal from the applied image signal and a system clock is generated with respect to these separated synchronizing signals. The write in control circuit 10 then generates a write in address signal for writing the applied image signal into the field memory 8 from these synchronizing signals and the system clock. The applied image signal is converted into a digital signal by the A/D converter 2 and is written into the memory 8 in accordance with the write in address signal. In this way and image signal for one field is written into the memory 8.

The image signal stored in the memory 8 is read out in accordance with the read out address signal set up for the read out control circuit 12 which depends on the degree of enlargement of the image. After interpolation processing has been carried out by the interpolation processor 20, the switch 22 is switched over from the synchronizing signal for the applied image signal to the synchronizing signal portion for the image signal which has undergone image enlargement image processing. This signal is then converted to an analog signal by the D/A converter 26 and produced.

Next, the read out control for when the center of the picture is enlarged by two times using image enlargement processing will be described. As is shown in FIG. 4(b), when expanding by two times, if the data "a" in the memory is read out twice, "a" becomes "a"+"a". If half of the horizontal image signal part is read out, the same data is then read out again on the next horizontal scan for the image signal part. In this way, the image for the signal for half of the horizontal image signal part of the actual image signal is enlarged by two times in the horizontal direction and the vertical direction. By repeating this kind of control, the central part of the picture is enlarged by two times.

When enlarging by four times, as is shown in FIG. 4(c), the same data is read out from the memory 8 four times. If a quarter of the horizontal image part is read out, the same data is read out for the horizontal sections for the next three scans. By carrying out this operation, a quarter part of the horizontal image signal for the actual image signal is enlarged four times in the horizontal direction and four times in the vertical direction. By repeating this kind of control the central part of the picture can be expanded four times.

Next, a circuit for carrying out picture enlargement processing for a third example of the prior art will be described.

With regard to FIG. 3, the synchronizing signal separation circuit 4 separates the horizontal synchronizing signal and the vertical synchronizing signal from the applied image signal and a system clock is generated with respect to these separated synchronizing signals. The write in control circuit 10 then generates a write in address signal for writing the applied image signal into the field memory 8 from these synchronizing signals and the system clock.

The applied image signal is converted into a digital signal by the A/D converter 2 and is written into the memory 8 in accordance with the write in address signal. In this way and image signal for one field is written into the memory 8.

The image signal stored in the memory 8 is read out in accordance with the read out address signal set up for the read out control circuit 12 which depends on the degree of enlargement of the image. After interpolation processing has been carried out by the interpolation processor 20, the switch 22 is switched over from the synchronizing signal for the applied image signal to the synchronizing signal portion for the image signal which has undergone image enlargement image processing. This signal is then converted to an analog signal by the D/A converter 26 and produced.

Next, the read out control when the central portion of the picture is enlarged two times by image enlargement processing will be described. When the picture is to be enlarged by two times, the items of data are read out from the memory 8 twice starting from the read out point. If half of the horizontal image signal part is read out, the same data is then read out again on the next horizontal scan for the image signal part. In this way, the image for the signal for half of the horizontal image signal part of the actual image signal is enlarged by two times in the horizontal direction and the vertical direction. By repeating this kind of control, the central part of the picture is enlarged by two times. However, interpolation processing is carried out by the interpolation processor 20 because if the degree of enlargement is made big without any modification, large blocks occur because picture elements for the same data are used and a mosaic effect can be seen in the image. Particularly, if the space between the vertical picture elements is large in comparison to that for the picture elements in the horizontal direction, detriments in the picture quality become noticeable. So, as is shown in FIG. 5, a smoother picture is obtained by carrying out mean value interpolation processing using a circuit which obtains mean of the value for the current line picture element and the picture element for the previous line.

A fourth example of the prior art will now be described.

Large capacity memory is expensive for use in the public domain. The memory can be economized, however, by compressing the data for the input signal when it is digitized so that it takes up less space and then storing it in the memory. When the data is then read out of the memory, it is expanded back to its original form. A circuit for a fourth example of the prior art which carries out this kind of signal processing while enlarging the image will now be described using FIG. 6.

In this diagram, the synchronizing signal separation circuit 4 separates the horizontal synchronizing signal and the vertical synchronizing signal from the applied image signal and a system clock is generated with respect to these separated synchronizing signals. The write in control circuit 10 then generates a write in address signal for writing the applied image signal into the field memory 8 from these synchronizing signals and the system clock. The applied image signal is converted into a digital signal by the A/D converter 2. It is then compressed by 1/n by a compressor 218 before being written into the memory 8 in accordance with the write in address signal. In this way an image signal for one field is written into the memory 8.

The image signal stored in the memory 8 is read out in accordance with the read out address signal set up for the read out control circuit 12 which depends on the degree of enlargement of the image and is enlarged by a factor of n by the expansion circuit 220. After interpolation processing has been carried out by the interpolation processor 21, the switch 22 is switched over from the synchronizing signal for the applied image signal to the synchronizing signal portion for the image signal which has undergone image enlargement image processing. This signal is then converted to an analog signal by the D/A converter 26 and produced.

However, the examples 1 to 4 of the prior art described above have the following problems.

When the image enlargement process is carried out using the circuit construction in the first example of the prior art, as is shown in FIG. 3, when the picture is moving, horizontal lines can be seen between images within the picture which differ in time by a period of one field.

This problem occurs because the write in address signal overtakes the read out address signal i.e., as can be seen from FIG. 2(b), while the read out address signal is moving from A to A' the write in address signal is moving from B to B' and the write in address therefore overtakes the read out address midway through the picture. Until the write in address takes over the read out address, the image signal for one image previous is produced. However, if the write in address overtakes the read out address, the image signal for the value written in after is produced. So, the instant that the write in address overtakes the read out address, the read out image signal is one field late or early.

With the image enlargement process which uses the circuit structure in the second example of the prior art, as is shown in FIG. 4(b) and FIG. 4(c), if the degree of enlargement is made large, the picture element blocks for the same one piece of data become large so that a mosaic effect can be seen in the image. Also, the resulting picture also becomes difficult to look at due to 30 Hz flicker caused by the shift in the luminance signal for the odd field images and the even field images becoming large.

By using average value interpolation processing in the third example of the prior art, steep changes in the image are made smoother, so that the image looses some of its sharpness.

With the circuit having the structure of that in the fourth example of the prior art, the carrying out of compression and enlargement causes slight picture degradation. If one part of this degraded picture is then enlarged under the control of the read out controller 12, if this degree of enlargement is large, then the degradation in the quality of the enlarged image will also become large.

With, for example, items such as high resolution televisions, VCRs or high resolution cameras with built-in VCRs, a sampling frequency of 14.3 MHz is widely used in order to maintain picture quality when the applied signal is digitised. Therefore, if the amount of information accompanying this for the image signal for one field is increased, a large amount of memory becomes necessary. So, in order to economize on memory capacity, the following two compression methods were investigated to economize on the amount of memory taken up by compressing the applied image signal by half. A method where the sampling frequency is reduced by half in order to reduce the information for the applied image signal by half and a method where the signal information is compressed by half which utilizes correlation with the neighboring picture element for the applied image signal known as DPCM (estimation encoding). However, although these differ depending on the compression method, the signal which results when the compressed signal is expanded back to its original form is noticeably degraded when compared to the original signal. If the sampling frequency is reduced by half, the resolution also deteriorates by half, and in the case of DPCM a phenomenon known as edge busyness occurs. If this kind of deteriorated picture is than enlarged to a larger and larger degree, the picture quality deteriorates more and more (refer to FIG. 7).

Also, conventionally, image sensing apparatus such as video cameras take an image sensing signal from an image sensing element and convert it into a digital signal using an A/D converter. Digital processing is then carried out on this digital signal by an image signal processing circuit. Signal processing such as filtering, color isolation, gamma compensation, and matrixing is then carried out on this A/D converted image signal by the image signal processing circuit. This processed image signal is then A/D converted and produced.

A timing signal generator for generating each of the various timing signals necessary for carrying out signal processing with signals such as the blanking signal and the synchronizing signal is installed in the image signal processing circuit used in the prior art image processing apparatus. However, shifts occur in the operational timing while transfers are being carried out between each of the various parts such as the image sensing elements, image sensing element drive circuits or circuits performing any additional periphery functions in the digital signal processing for this prior art image sensing apparatus. In order to achieve this, separate circuits have to be set up for generating the necessary timing for each part and/or complicated adjustment circuits have to be added. If these circuits are integrated into a single integrated circuit there are problems such as the circuit being large and the fact that costs cannot be reduced.

SUMMARY OF THE INVENTION

It is the object of the present invention to provide an image signal processing apparatus to solve the problems described above.

It is a further object of this invention to provide an image signal processing apparatus which is capable of carrying out enlargement processing without deteriorating the image signal.

In order to accomplish the above objects, according to the present invention, under the conditions for a first embodiment, an image signal processing apparatus for processing image signals comprises image storing means for storing and outputting applied image signals, writing-in control means for controlling the writing in of image signals to said image storage means, read out control means for controlling the produced of the image signal stored in said image storing means from said image storing means at a predetermined period in the timing which is later than that at which the image signal was written in by said write in control means, and controlling the produced from said image storage means of an image signal enlarged based on the image signal stored in said image storing means from said image storing means at a predetermined period in the timing which is later than that at which the image signal was written in by said write in control means and output changeover means for applied an image signal produced from said image storage means and an enlarged image signal, and changing over between produced the image signal during a blanking period occurring in the image signal and the enlarged image signal at times not falling within this blanking period.

It is a further object of this invention to provide an image signal processing apparatus which can carry out enlargement processing without putting the synchronization for the image signal into disarray.

In order to accomplish the above objects, according to the present invention under the conditions for the first embodiment, an image signal processing apparatus for processing image signals comprises image storing means for storing image signals to be applied, writing-in control means for controlling of the writing-in of the image signals, read out control means for controlling the production of an image signal enlarged based on the image signal stored in said image storing means at a time after the image signal was written in by said write-in control means, blanking signal generating means for generating a blanking signal at a predetermined point in the timing after the blanking signal included in the image signal was applied to said image storage means and output changeover means for applying an enlarged image signal produced by said image storage means and a blanking signal generated by said blanking signal generating means, and changing over between production of the blanking signal produced by said blanking image signal generating means during the blanking period in the image signal, and production of the enlarged image signal produced from said image storing means during times which do not fall within the blanking period.

Also, it is a further object of this invention to provide an image signal processing apparatus capable of carrying out enlargement processing on an image signal while using a memory with a small storage capacity.

In order to accomplish the above objects, according to the present invention under the conditions for the first embodiment, an image signal processing apparatus for processing image signals which comprises image storing means for storing image signals to be applied, indicating means for indicating the degree to which an image is to be expanded in accordance with an applied signal and enlargement processing means for receiving image signal information and compressing this image signal information by 1/n before storing it in said image storing means, reading out the image signal stored in said image storing means in accordance with the degree of enlargement and expanding and producing the read out image signal information if the degree of enlargement indicated by said indicating means is less than n, and applied the image signal information and storing it in said image storing means without compression, and reading out the image signal stored in said image storing means in accordance with the degree of enlargement and expanding and producing the read out image signal information if the degree of enlargement indicated by said indicating means is greater than n.

Further, it is another object of this invention to provide an image signal processing apparatus capable of carrying out enlargement processing on the image signal in a stable manner using a simple low cost structure.

In order to accomplish the above objects, according to the present invention under the conditions for the first embodiment, an image signal processing apparatus for processing image signals comprises image signal generating means for generating an image signal, image signal processing means having image storing means capable of storing an image signal for carrying out processing on image signals generated from said image generating means using said image storing means, storage control means for controlling the writing in and reading out of image signals for said image storing means in accordance with one of a plurality of operation modes and timing signal generating means for generating each of the various timing signals necessary for the processing occurring in said image signal processing means in accordance with operating modes in said storage control means for each of the various timing signals.

It is a further purpose of the present invention to provide an image signal processing apparatus where the construction and work involved in circuit adjustment is simple.

In order to accomplish the above objects, according to the present invention under the conditions for the first embodiment, an image signal processing apparatus for processing image signals comprises image signal generating means for generating an image signal, image signal processing means for processing the image signal generated buy said image signal generating means and control signal generating means for generating with optional timing an image signal generating control signal for controlling the generation of image signals by said image signal generating means and an image signal processing control signal for controlling the processing of the image signal by said image signal processing means.

Objects and characteristics of this invention other than those which are described above will become clear by following the detailed description which comes afterwards while referring to the drawings.

BRIEF DESCRIPTION OF THE DRAWINGS

FIG. 4 is a view describing the operation of the structure in FIG. 3;

FIG. 19 is a timing diagram describing the operation of the structure in FIG. 17;

FIG. 20 is a view for describing the picture enlargement processing operation for the structure in FIG. 17.

DETAILED DESCRIPTION OF THE PREFERRED EMBODIMENTS

First Embodiment

The following is a description of how the image expanding process is carried out in embodiments one to seven of this invention.

Embodiments one to three correspond to the first example of the prior art, embodiment four corresponds to the second example of the prior art, embodiments five and six correspond to the third example of the prior art and embodiment seven corresponds to the fourth example of the prior art.

First Embodiment

Figure 8:
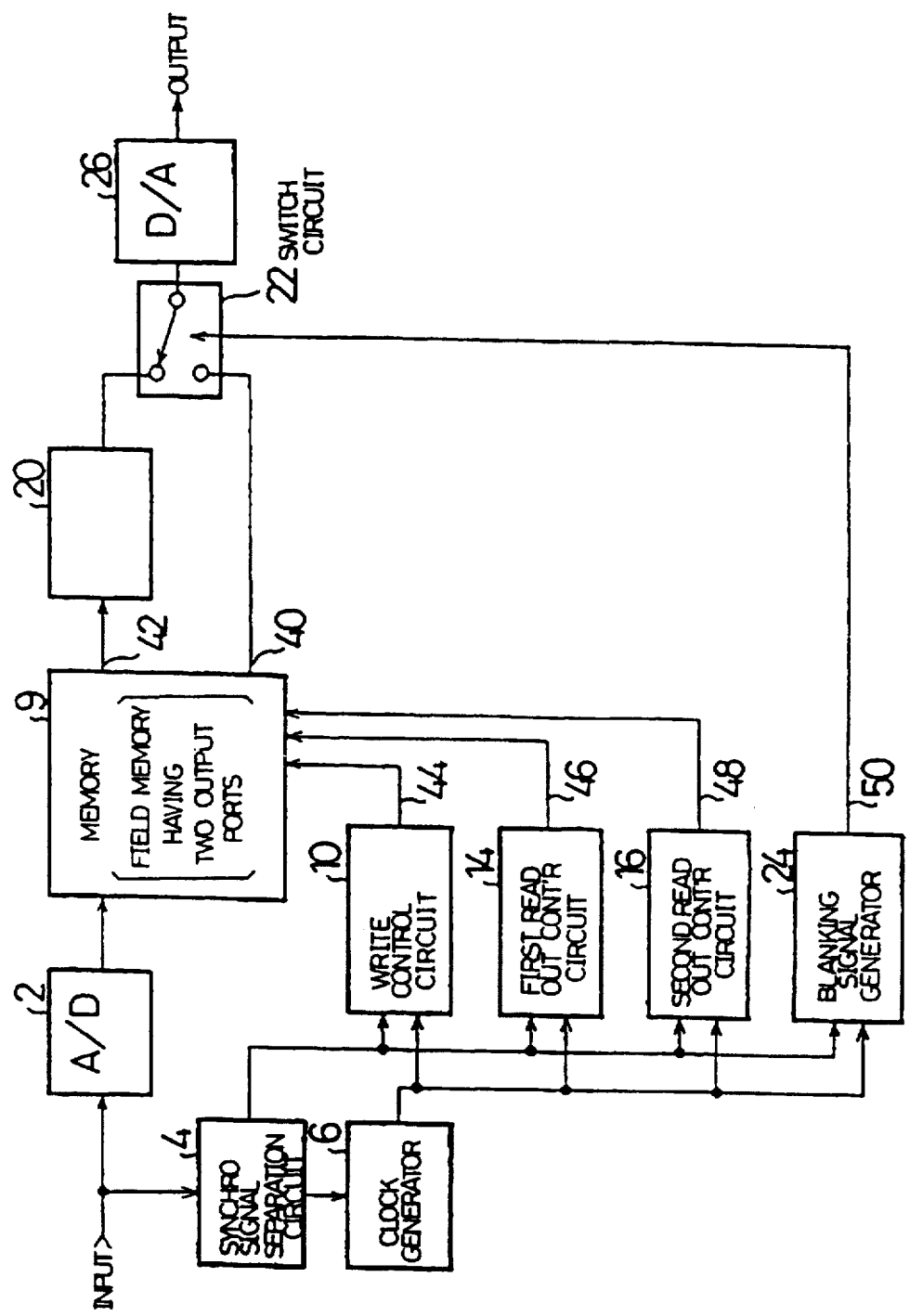
FIG. 8 is a block diagram of the construction of an image signal processing apparatus for a first embodiment of this invention.

FIG. 8 is a block view of an image signal processing apparatus for a first embodiment. In this diagram, numeral 2 indicates an A/D converter for changing the input image signal into a digital signal, numeral 4 indicates the synchronizing signal separation circuit for separating the vertical synchronizing signal and the horizontal synchronizing signal from the input image signal, numeral 6 indicates a clock generator for generating a system clock from the separated synchronizing signals. Also, numeral 9 indicates a memory (field memory) having two output ports, for storing the digital signal for the input image, numeral 10 indicates the write-in controller for generating the write-in address signal for writing the input image signal into the memory 9 using the synchronizing signal and the system clock, numeral 14 indicates a first read out controller for reading out the image signal stored in the memory 9 ½.V (described later) later, numeral 16 indicates a second read out controller for reading out the image signal stored in the memory 9 ½V later and enlarging it to a predetermined extent and numeral 20 indicates a compensation processor for enlarging the image signal read out by the second read out controller 16. The numeral 22 indicates a switch for changing over from the synchronizing signal portion of the image signal which underwent interporation processing to the synchronizing signal of the input image signal, numeral 24 indicates the blanking signal generator for generating a blanking signal from the synchronizing signal and the system clock for controlling the switch 22 and numeral 26 indicates the D/A converter for converting the output image signal from the switch 22 into and analog signal.

Next, the operation will be described.

Figure 9:
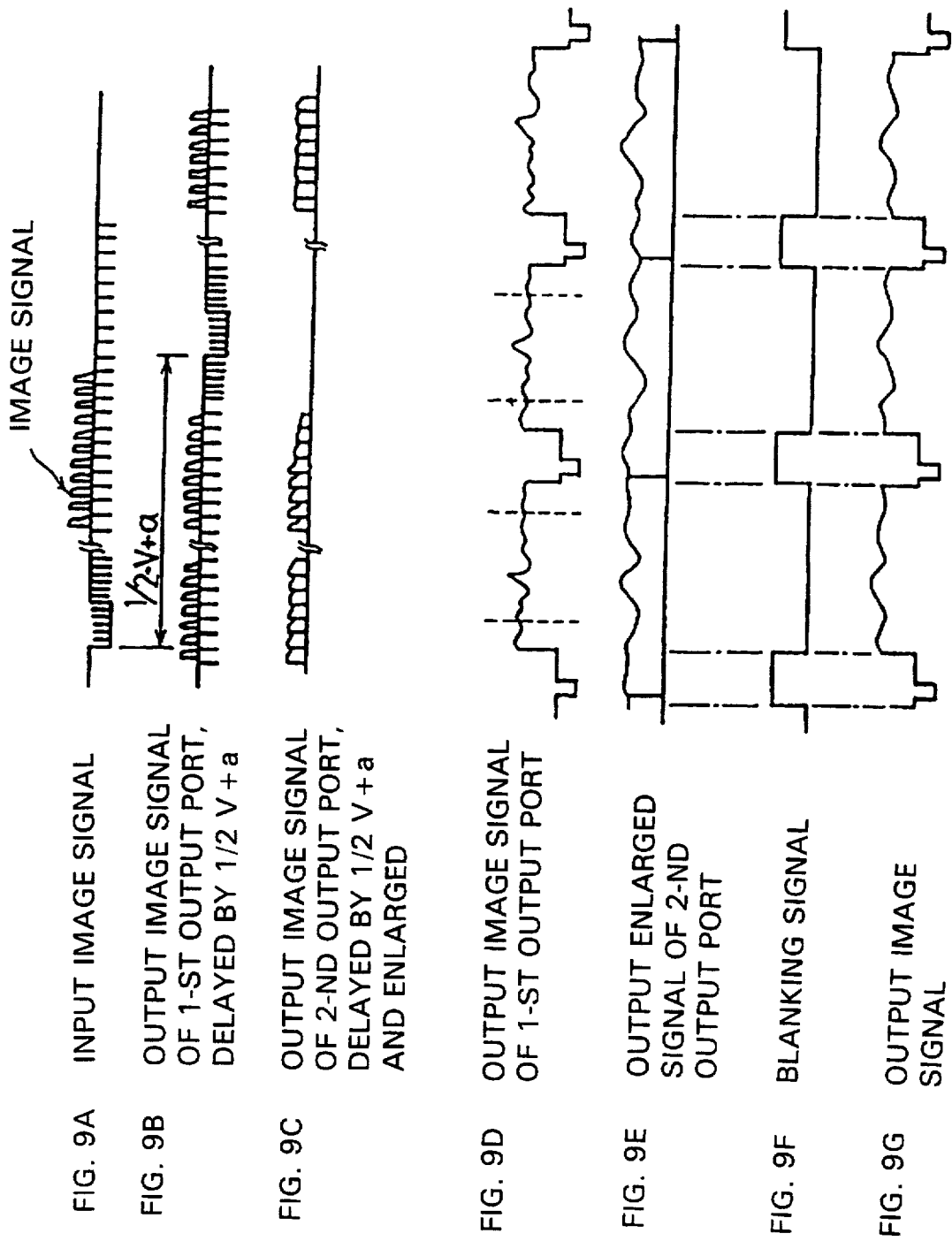
FIG. 9 is a timing diagram describing the operation of the structure in FIG. 8.

Here, the read-out operation will be described as the write in operation is the same as that for the prior art. The first read-out control circuit 14 generates a first read-out address signal capable of reading out the data stored in the memory 9 from the first output port 40 of the field memory 9 which has two output ports, as is shown in FIG. 9(b), at a time delayed by ½.V+a with respect to the synchronizing signal of the input image signal. Here, V is the period of time to scan one field, which for an NTSC signal is about 16.7 m secs and a value for a which is suitable for a particular circuit should be chosen.

The second read-out controller 16 generates a second read-out address which is set up according to the image enlargement rate at a time delayed by ½.V+a with respect to the synchronizing signal of the input image signal as shown in FIG. 9(c), in the same way as was the case for the first read out address signal. If, for example, the central part of the picture is to be enlarged by a factor of two, the control of the read out address signal is the same as that described in the first example of the prior art. As the image signal for the enlarged image read out from the second output port 42 of the memory 9 is an unattractive mosaic pattern, it is smoothed out using interporation processing by the interporation processor 20, after which it is input to the switch 22. The image signal read out from the first output port 40 of the memory 9 by the first read out address signal is also applied to the switch 22. The switch 22 is switched over by the blanking signal 50 generated by the blanking signal generator 24 so as to change over from the synchronizing signal portion of the image signal for the expanded image signal which has undergone interporation processing to the synchronizing signal for the input image signal. The image signal for the enlarged image for the synchronizing signal which has been changed over to is then externally produced after having been converted to an analog image signal by the D/A converter 26.

By carrying out this kind of control, the write in address will not overtake the read out address signal halfway, so that aberrations in the picture are removed.

So, according to this embodiment described above, by using a (field) memory with two output ports and by having the read out address signal delayed by approximately ½.V seconds with respect to the write in address signal, even if the central portion of the picture is enlarged one, two, or even four times by the image enlargement process, the write in address will not overtake the read out address signal halfway, the fields before and after each field in the center of the picture are merged, and the generation of a picture in which horizontal lines can be seen is avoided.

Second Embodiment

Figure 10:
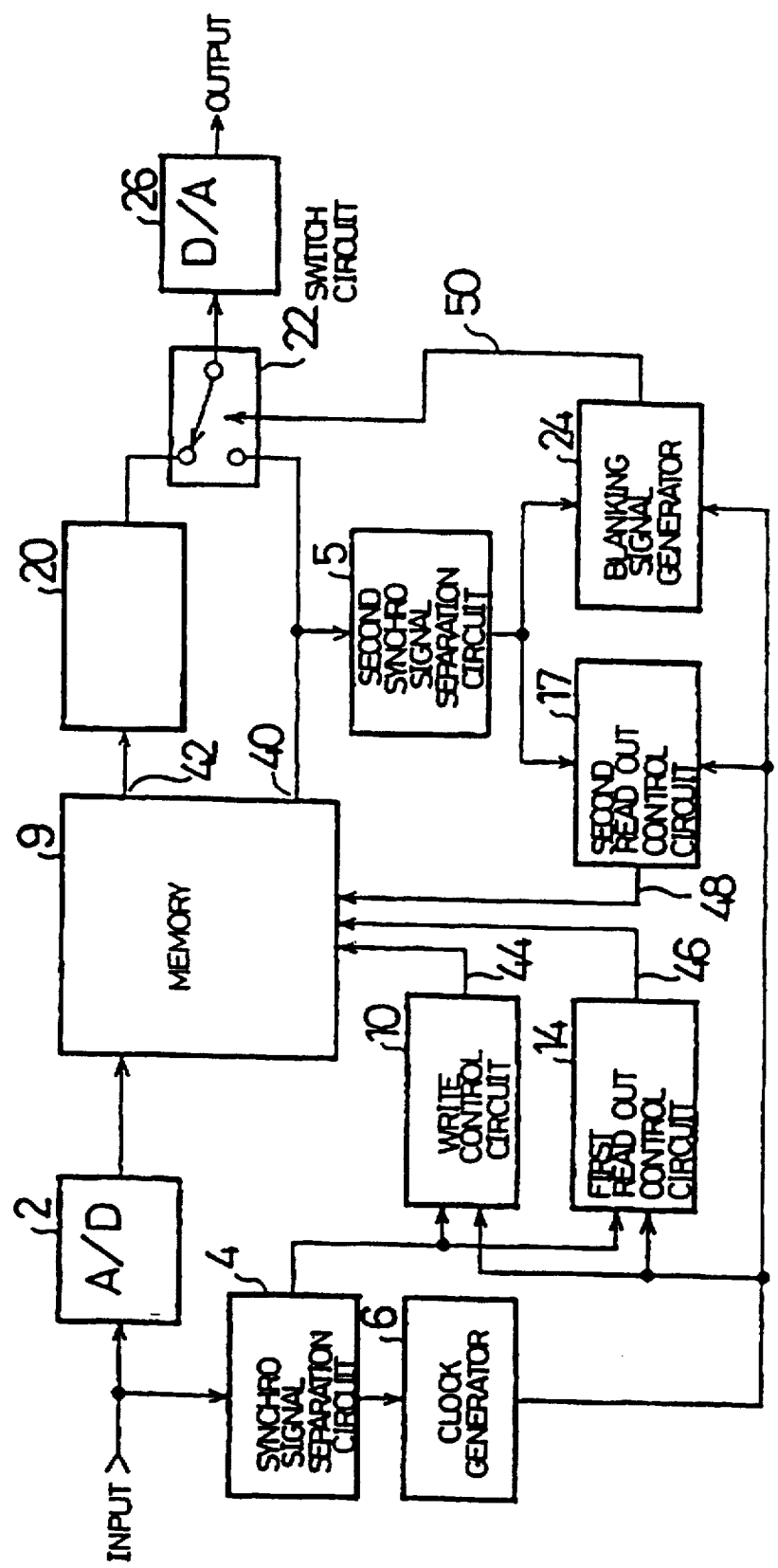
FIG. 10 is a block diagram of the construction of an image signal processing apparatus for a second embodiment of this invention.

FIG. 10 is a view of the construction of a second embodiment. In FIG. 10, the operation of the A/D converter 2, the synchronizing signal separation circuit 4, the clock generator 6, the write in controller 10 and the first read out control circuit 14 is the same as in the first embodiment. Here, the first read out address signal reads the data out from the field memory 9 having two output ports after a delay of ½.V secs with respect to the synchronizing signal for the input image signal via the second output port 42. The vertically synchronizing signal and the horizontal synchronizing signal are then separated from the read out data produced from the first output port 40 of the field memory 9 at a second synchronizing signal separation circuit 5. A second read out controller 17 then generates a second read out address signal from the system clock generated by the clock generator 6 and the vertically synchronizing and horizontal synchronizing signals separated by the second synchronizing signal separation circuit 5 and outputs it to the memory 9. The control for the second read out address signal is the same as that described in the first embodiment. Also, a blanking signal is generated by the blanking signal generator 24 from the system clock generated by the clock generator 6 and the vertical synchronizing and horizontal synchronizing signals separated by the second synchronizing signal separation circuit 5 and this is output to the switch 22. This kind of construction will give the same effects as those obtained for the first embodiment.

Third Embodiment

Figure 11:
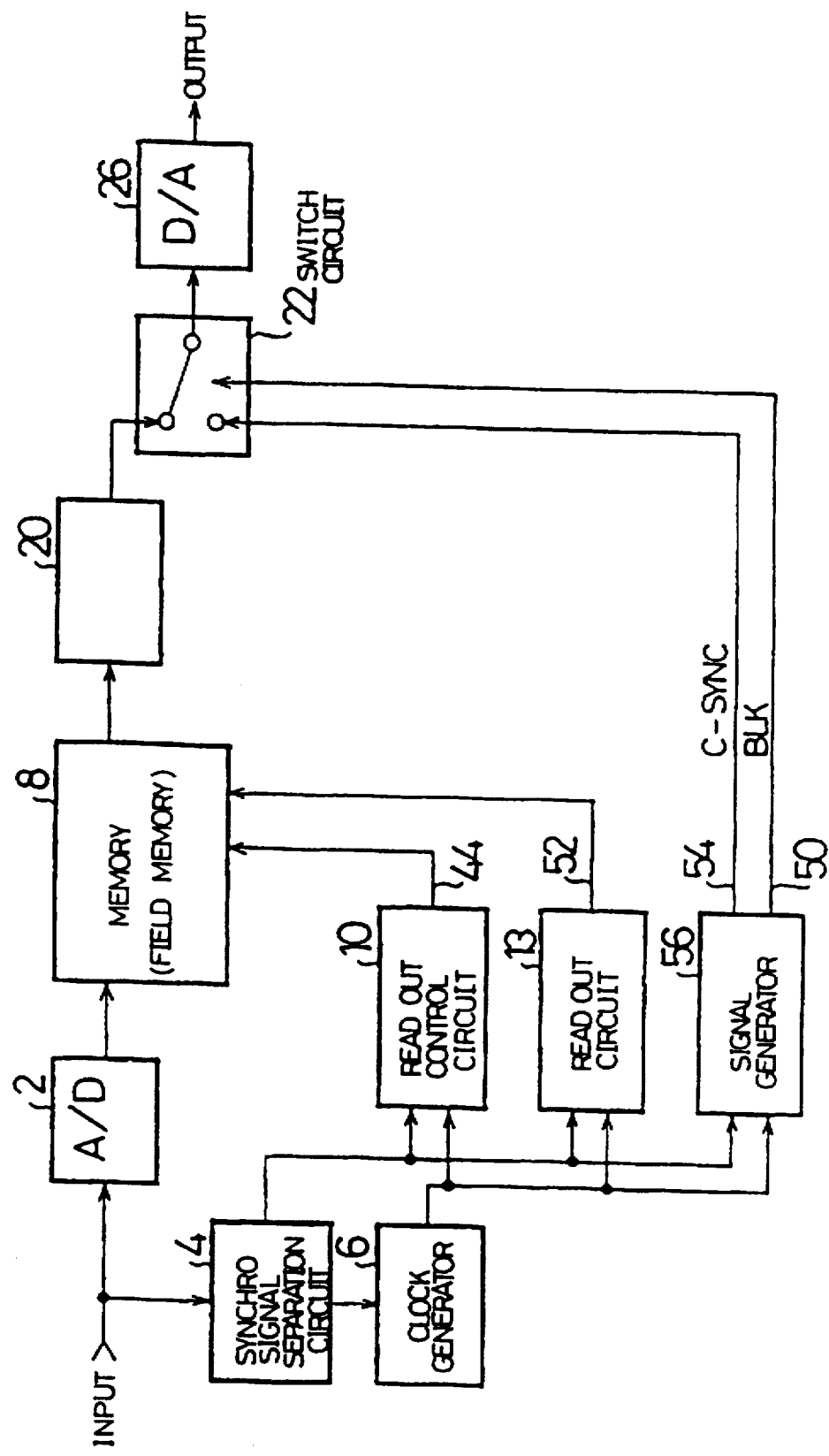
FIG. 11 is a block diagram of the construction of an image signal processing apparatus for a third embodiment of this invention.
Figure 12:
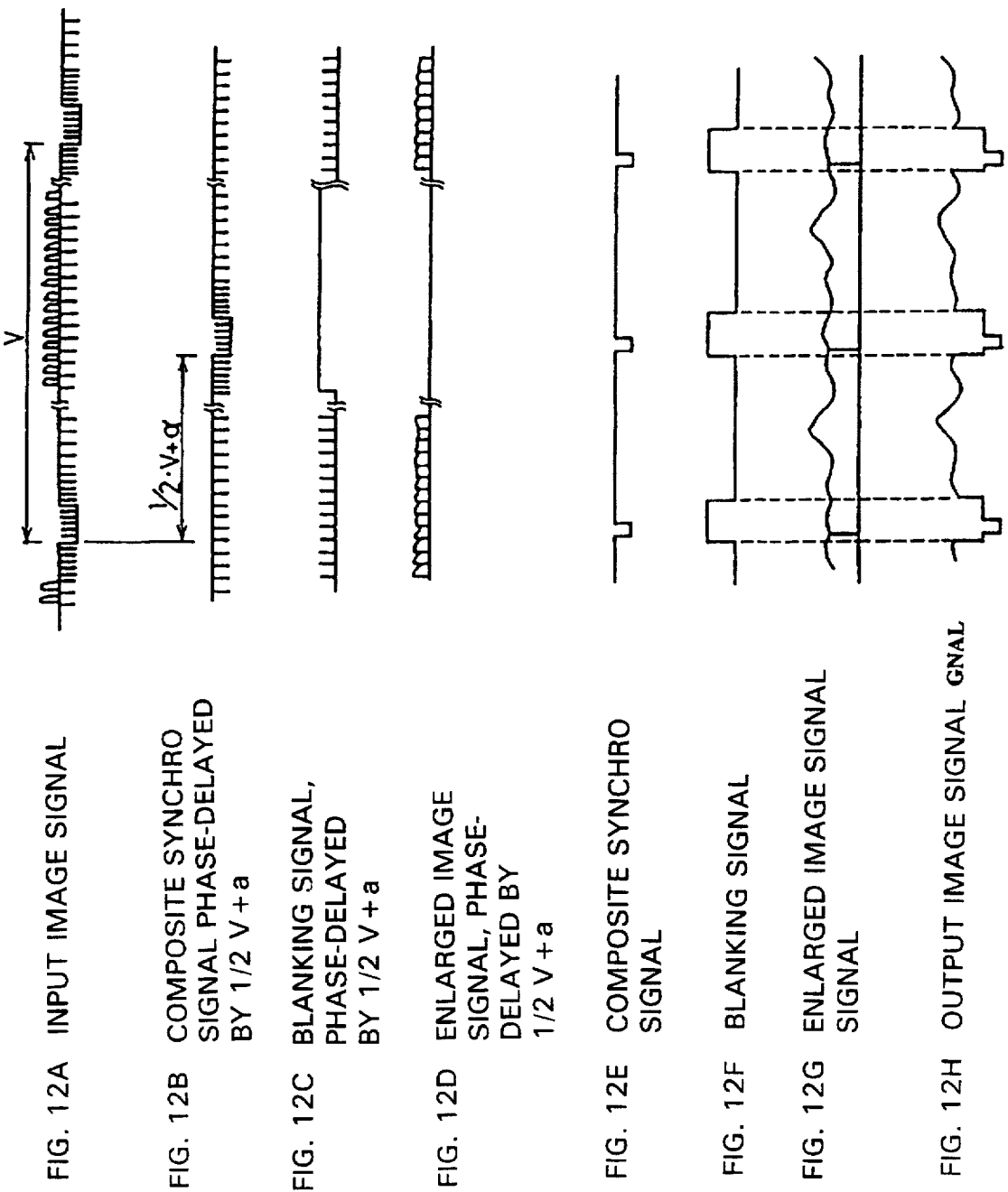
FIG. 12 is a timing diagram describing the operation of the structure in FIG. 11.

FIG. 11 is a view of the construction of a third embodiment. In this diagram, numeral 2 indicates an A/D converter for changing the input image signal into a digital signal, numeral 4 indicates the synchronizing signal separation circuit for separating the vertical synchronizing signal and the horizontal synchronizing signal from the input image signal, numeral 6 indicates a clock generator for generating a system clock from these separated synchronizing signals, numeral 8 indicates a field memory for storing the digital signal for the input image, numeral 10 indicates the write-in controller for generating the write-in address signal for writing the input image signal into the field memory 8 using the synchronizing signal and the system clock and numeral 13 indicates the read out controller for reading the image signal stored in the memory 8 about ½.V seconds later with respect to application of the image signal and expanding the image to the degree to which the expansion rate is set. The numeral 56 indicates a signal generator which generates a composite synchronizing signal which is about ½.V secs later than the synchronizing signal for the input image signal, numeral 20 indicates a interporation processor for carrying out interporation on the image signal for the enlarged image read out by the read out controller 13, numeral 22 indicates a switch for changing over from the synchronizing portion of the image signal for the expanded image which has undergone the interporation process to the composite synchronizing signal output of the signal generator 56 and numeral 26 indicates the D/A converter for converting the interporation processed image signal applied from the switch 22 into an analog signal.

Next, the operation will be described.

Here, the read out operation will be described, as the write in operation is the same as that described in the first embodiment. The read out controller 13 generates a read out address capable of reading out the data stored in the memory 9 and enlarge it in accordance with the set degree of enlargement at a period in the timing which is delayed ½.V+a with respect to the synchronizing signal for the input image signal. If, for example, the central part of the picture is to be enlarged by a factor of two, the control of the read out address signal is the same as that described in the first example of the prior art. As the image signal for the enlarged image read out from the memory 8 is an unattractive mosaic pattern, it is smoothed out using interporation processing by the interporation processor 20, before being produced to the switch 22. The switch 22 is then changed over from the synchronizing signal portion of the image signal for the enlarged image which has undergone interporation processing to the composite synchronizing signal generated by the signal generator 56 using the blanking signal generated at the signal generator 56. The image signal for the expanded signal changed over to from the synchronizing signal is then externally produced after having been converted to an analog image signal by the D/A converter 26.

By carrying out this kind of control, the write in address will not overtake the read out address signal halfway and the same effects as those for the first embodiment will be obtained.

Fourth Embodiment

Figure 13:
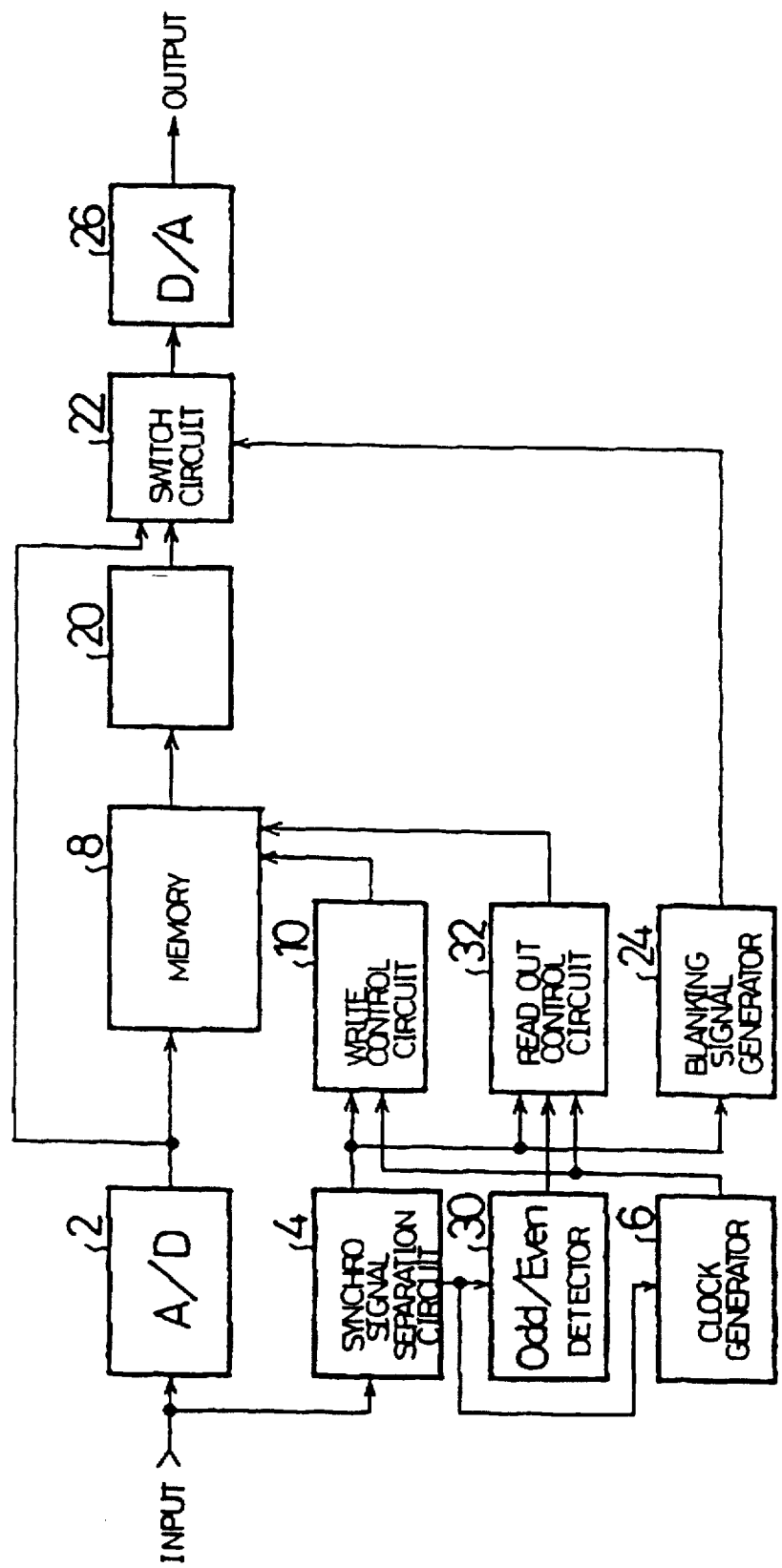
FIG. 13 is a block diagram of the construction of an image signal processing apparatus for a fourth embodiment of this invention.

FIG. 13 is a view of the construction of a fourth embodiment. In this diagram, numeral 2 indicates an A/D converter for changing the input image signal into a digital signal, numeral 4 indicates the synchronizing signal separation circuit for separating the vertical synchronizing signal and the horizontal synchronizing signal from the input image signal, numeral 6 indicates a clock generator for generating a system clock from the these separated synchronizing signals, numeral 8 indicates a memory for storing the digital signal for the input image, numeral 10 indicates the write-in controller for generating the write-in address signal for writing the input image signal into the field memory 8 using the synchronizing signal and the system clock and numeral 32 indicates a read out controller for reading out the image signal stored in the memory 8. The numeral 20 indicates the interporation processor for carrying out interporation on the image signal for the enlarged image read out by the read out controller 32, numeral 22 indicates a switch which changes over from the synchronizing signal portion of the image signal for the expanded image on which interporation processing has been carried out to the synchronizing signal for the input image signal, numeral 24 indicates a blanking signal generator which generates a blanking signal from synchronizing signal for controlling the changing over of the switch 22 and the system clock and numeral 26 indicates the D/A converter for converting the in terporation processed-image signal produced from the switch 22 into an analog signal.

Next, the operation will be described.

The read out operation will be described for the case where the image is enlarged four times, as the write in operation is the same as that described in the second example. Consider the case when an image made up from the image signals having 61 horizontal scanning periods from input image signal line n to line (n+60) is enlarged four times in the vertical direction to line 18 to line 260. In the case of odd fields, as is shown in FIG. 14(b), the data for line n stored in the memory 8 is read out four times to the four horizontal scanning periods from line 18 to line 21. Next, the read out address control is repeated so that the data in line (n+1) is repeatedly read out to line 22 to line 25. Then, in the case of even fields, the data for line n stored in the memory 8 is read out four times to the four horizontal scanning periods for line (18+k) to line (21+k). The data for line (n+1) is then read out four times to the four horizontal scanning periods for line (22+k) to line (25+k). In this way the read out timing for odd fields can be shifted by k lines by the read out address control. When the image is to be enlarged four times a suitable value for k is 2 and it becomes clear from the diagrams that making the value for k high makes the image easy to see.

Figure 14:
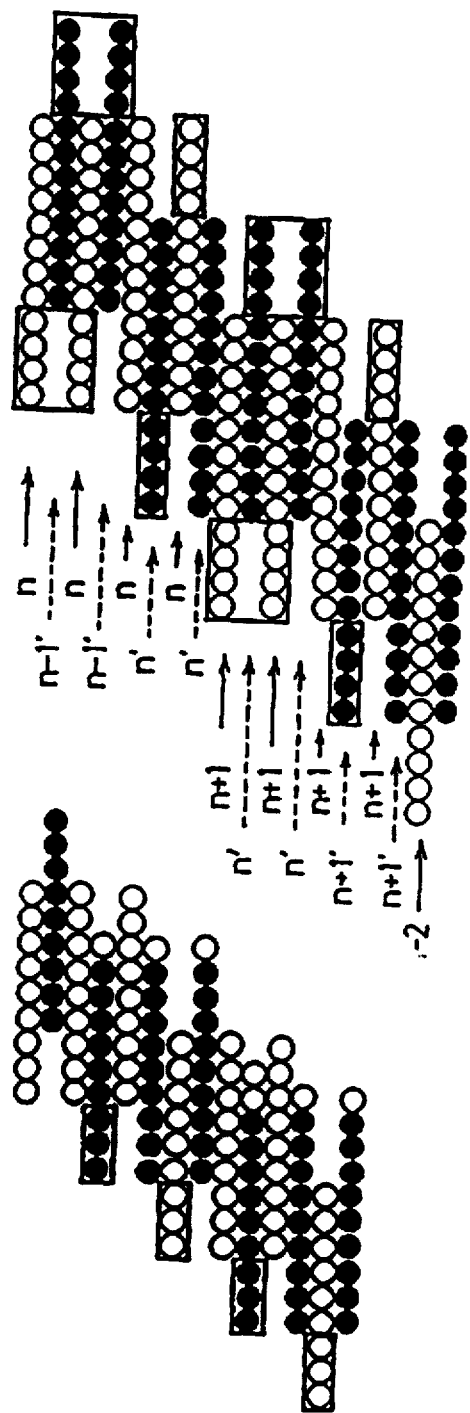
FIG. 14 is a view describing the operation of the structure in FIG. 13.

So, according to the embodiment described above, if the timing for reading out the signal stored in the memory is shifted by k lines for when odd fields are read out and for when even fields are read out, as is shown in FIG. 14, the shift in area between the odd field luminance signal and the even field luminance signal occurring in the image signal for the expanded signal becomes small and it becomes more difficult for 30 Hz flicker to stand out.

Fifth Embodiment

Figure 1:
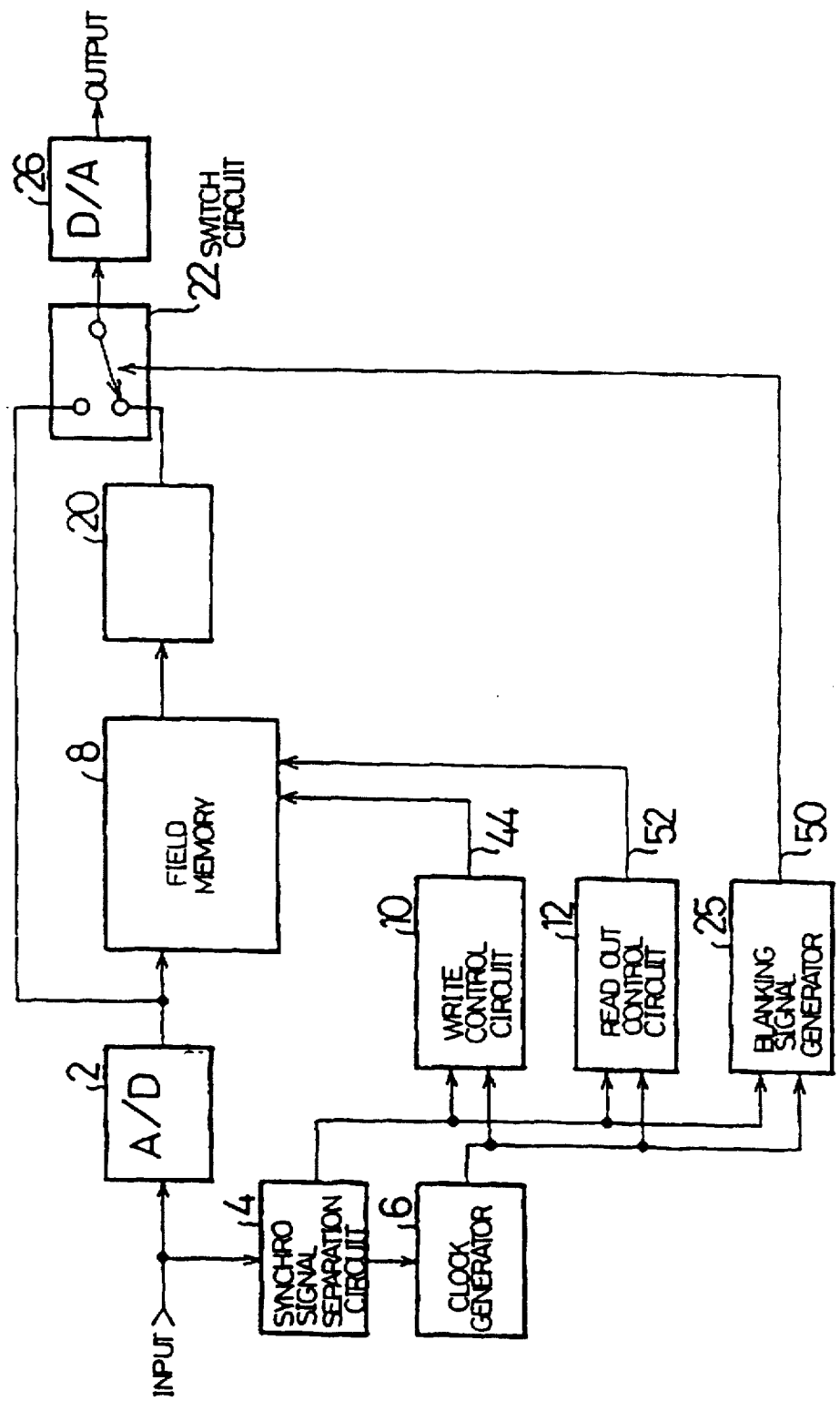
FIG. 1 is a block diagram of the structure of an image signal processing apparatus for a first example of the prior art.
Figure 2:
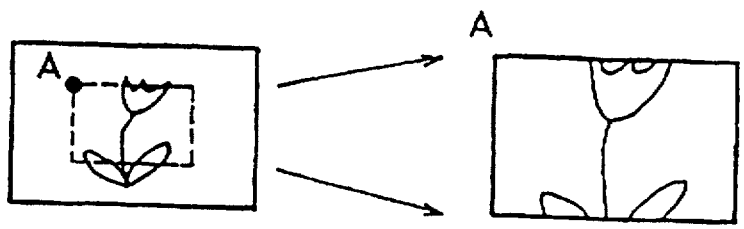
FIG. 2 is a view describing the operation of the structure in FIG. 1.
Figure 2:
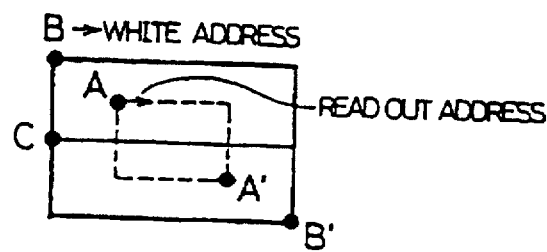
Figure 2:
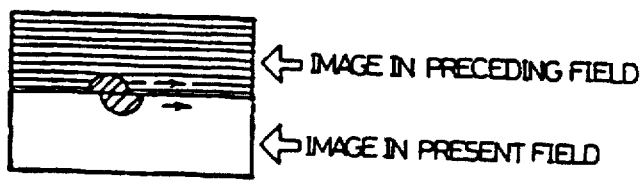
Figure 3:
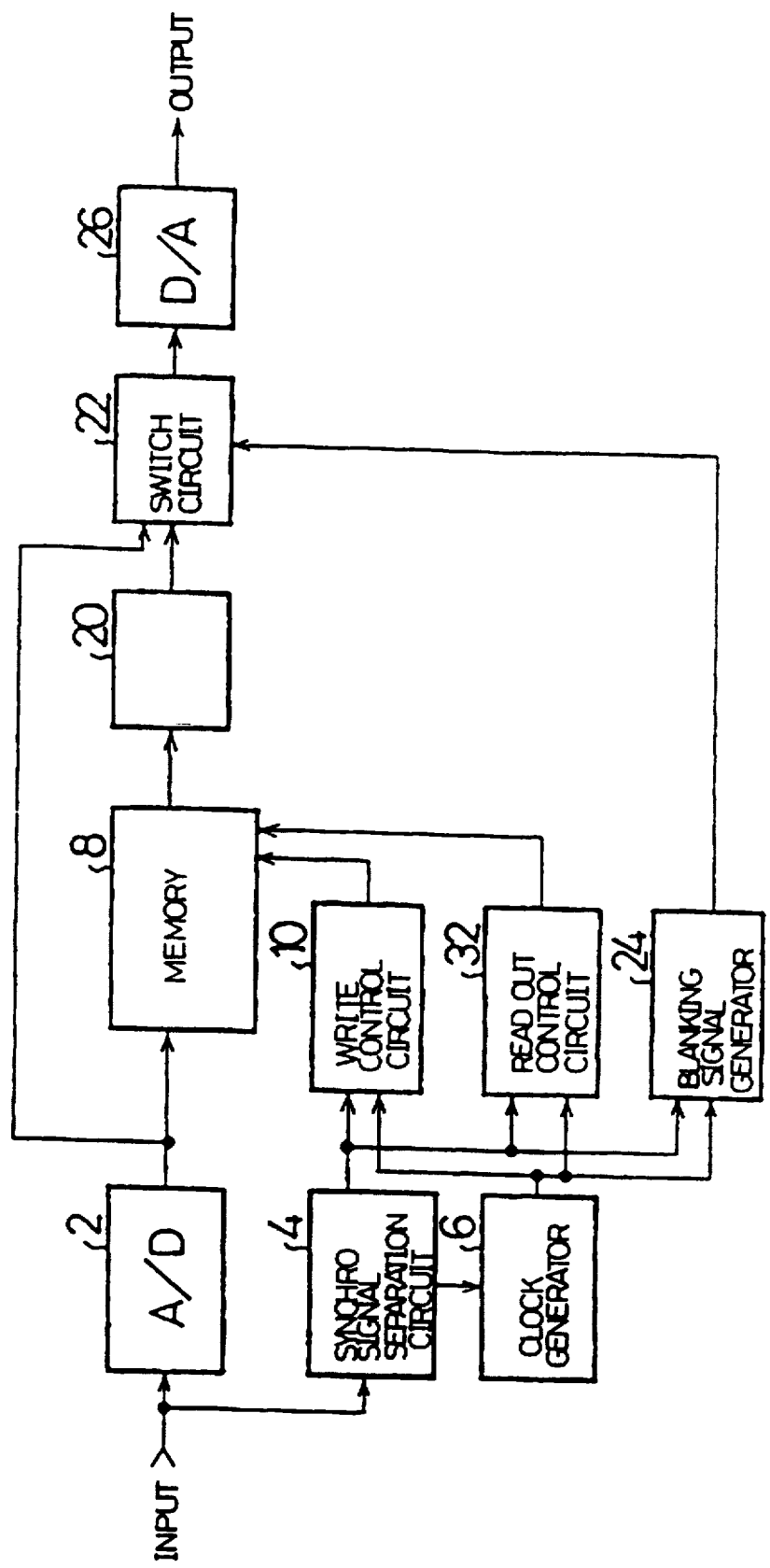
FIG. 3 is a block diagram of the structure of an image signal processing apparatus for a second example of the prior art.
Figure 5:
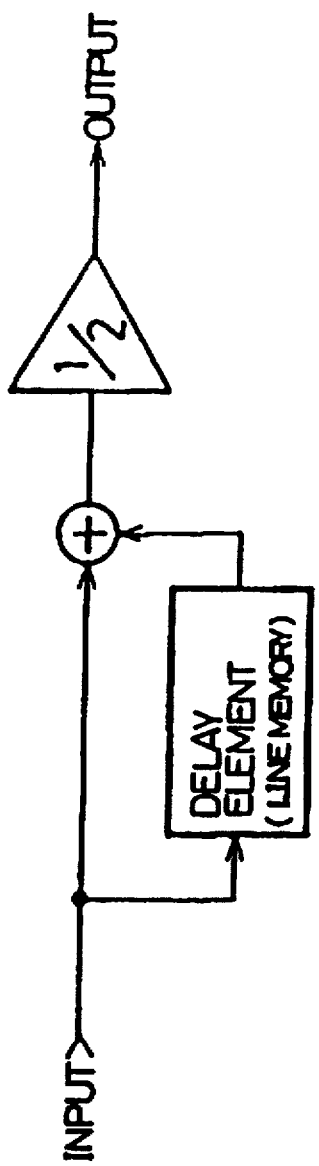
FIG. 5 is a block diagram of the structure of the compensation circuit in FIG. 3.
Figure 6:
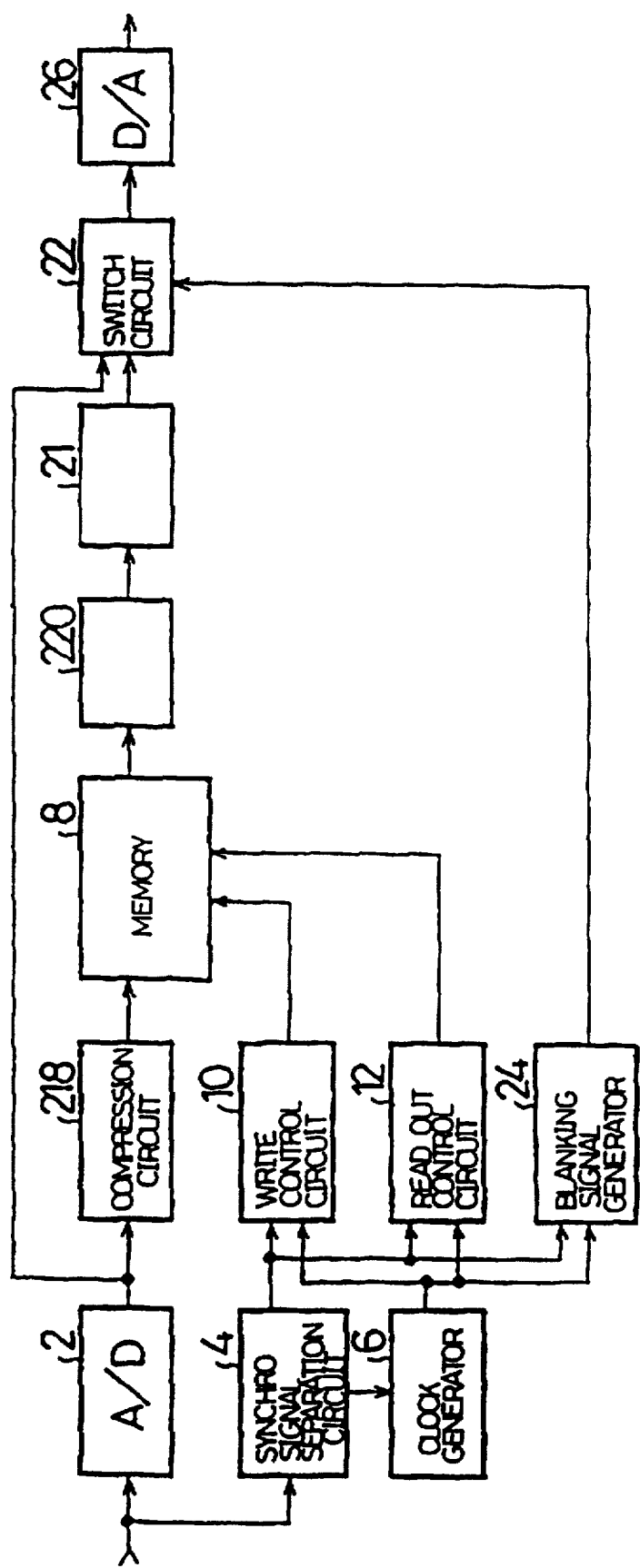
FIG. 6 is a block diagram of the structure of an image signal processing apparatus for a fourth example of the prior art.
Figure 7:
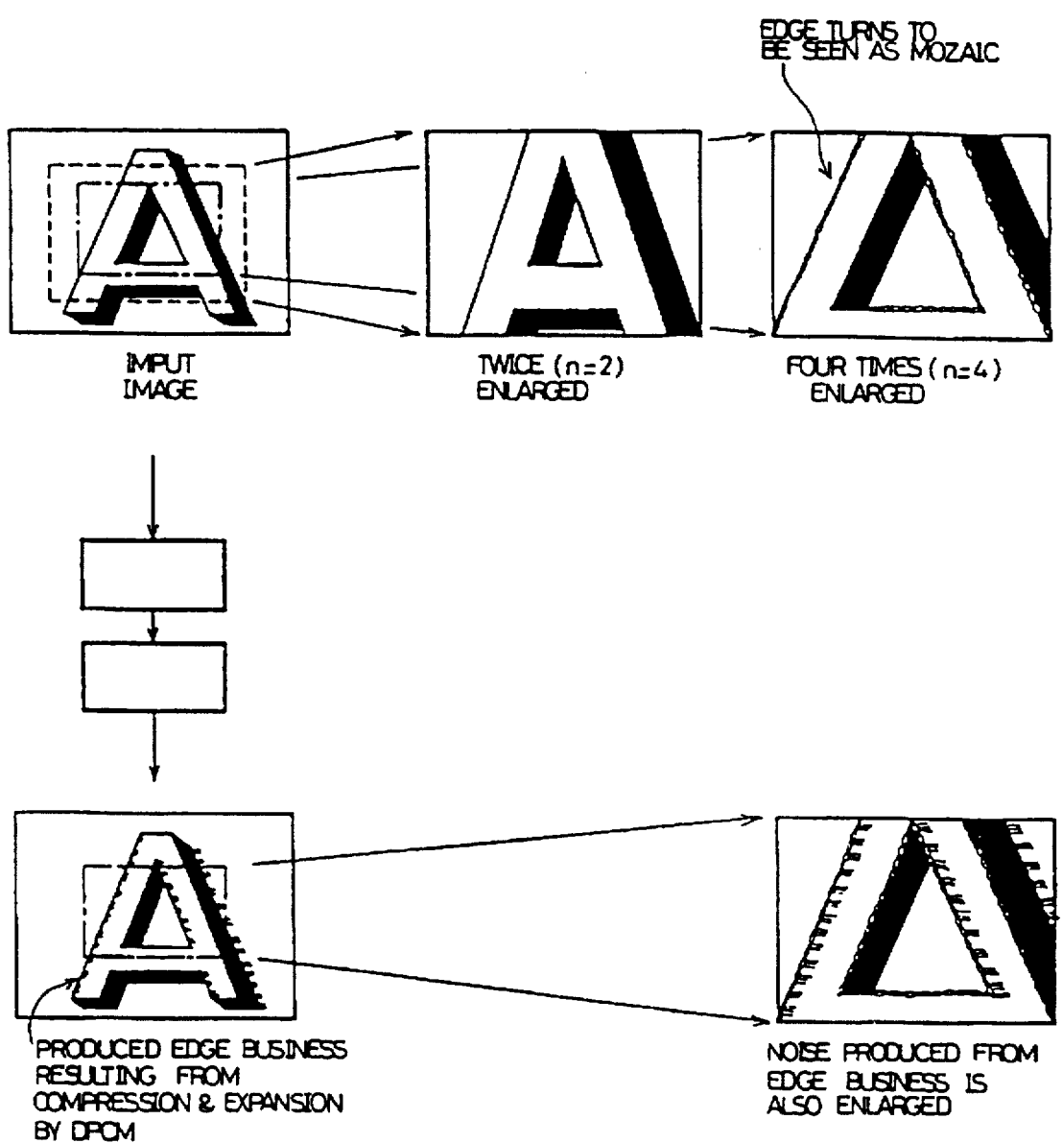
FIG. 7 is a view describing the operation of the structure in FIG. 6.
Figure 15:
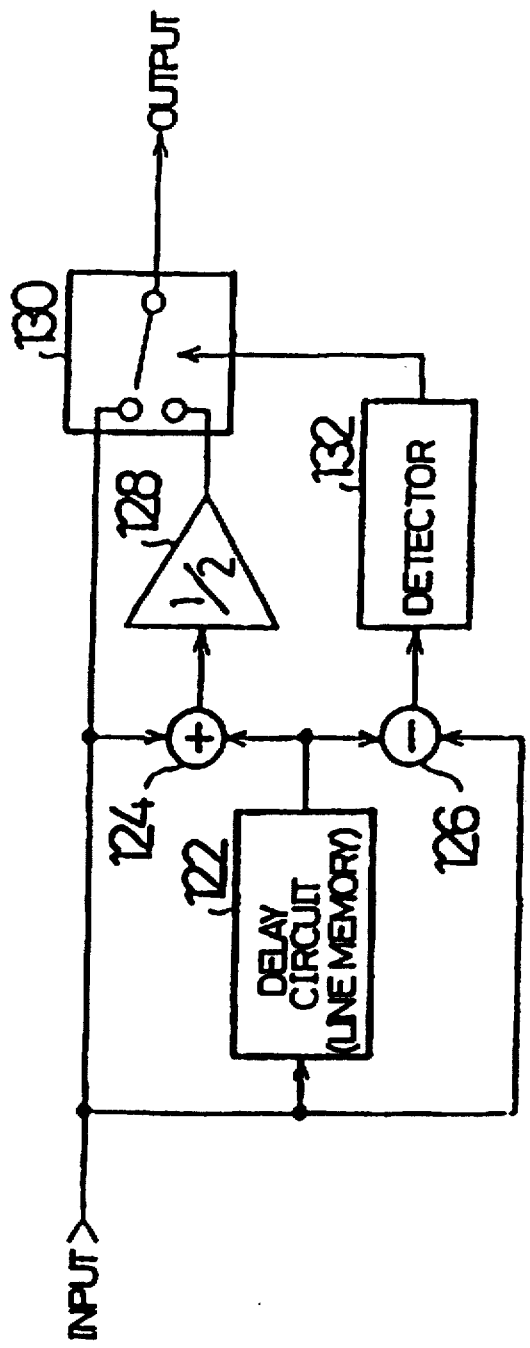
FIG. 15 is a block diagram showing the structure of the compensation circuit occurring in the image signal processing apparatus for a fifth embodiment of the present invention.

FIG. 15 is a block view of the interporation circuit for this embodiment. Parts other than the interporation circuit have the same construction as those shown in FIG. 3. Signals read out in accordance with the degree of image expansion are applied into the interporation circuit shown in FIG. 15. After being delayed by the one line delay circuit 122, the signal is inputted to the adder 124 and the subtractor 126. The signal produced from the one line delay circuit 122 and the signal read out from the memory 8 are added together at the adder 124 with the result being produced to the divider 128. At the divider 128, the input signal is halved before being produced to the switch 130. On the other side, at the subtractor 126, the difference between the signal produced from the one line delay circuit 122 and the signal read out from the memory 8 is obtained and this absolute value is produced to the identification circuit 132. At the identification circuit 132, the level of the applied signal and a preset threshold voltage are compared and the result is produced to the switch 130. i.e. if the level difference between the applied image signal and the one line delay image signal is smaller than the threshold value, the output signal from the divider 128 is produced. If it is bigger, the switch 130 is controlled so that the signal read out from the memory 8 is produced without modification.

By carrying out this kind of control, when the level of the signal for a picture element for the current line is compared with the one for that for one line previous and the level difference between these signals is greater than a preset threshold value i.e. mean value interporation is stopped and previous value interporation (also known as previous place hold interporation) is carried out, fading at the edges of the image is prevented, and by using mean value interporation for places other than the edge, it is possible to prevent the image from becoming mosaic shaped.

Sixth Embodiment

In the fifth embodiment a interporation method for the vertical direction of the picture is described but the same method is also suitable as an interporation method in the horizontal direction. The delay circuit 122 in FIG. 15 may delay just one picture element at a time. Also, if the interporation circuit in the fifth embodiment and the interporation circuit in this embodiment are connected in series, the same effect can be obtained for the picture in the vertical direction and the horizontal direction.

Seventh Embodiment

Figure 16:
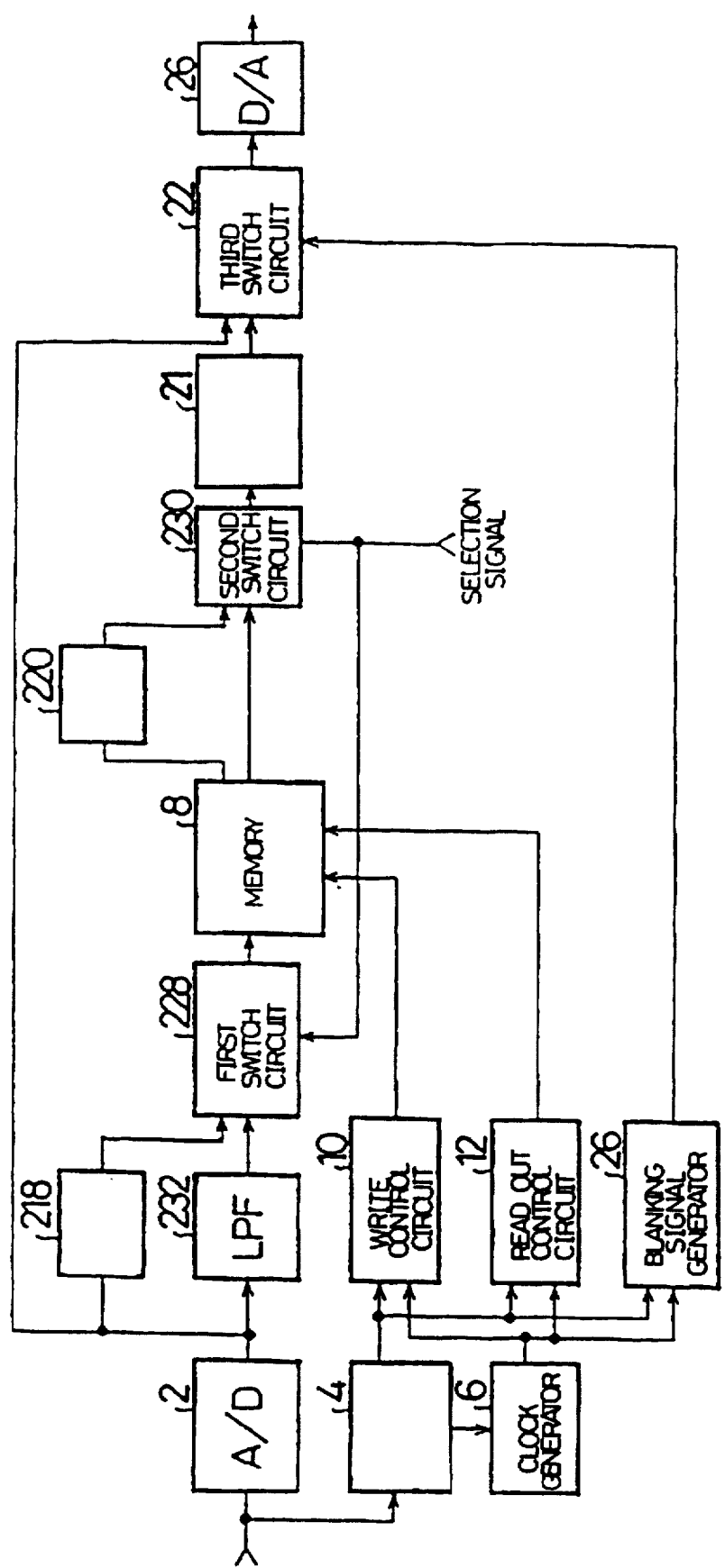
FIG. 16 is a block diagram of the construction of an image signal processing apparatus for a seventh embodiment of this invention.

FIG. 16 is a view of the construction of a seventh embodiment. In this diagram, numeral 2 indicates an A/D converter for changing the input image signal into a digital signal, numeral 4 indicates the synchronizing signal separation circuit for isolating the vertically synchronizing signal and the horizontal synchronizing signal from the input image signal and numeral 6 indicates a clock generator for generating a system clock from these separated synchronizing signals. The numeral 218 indicates a compression circuit for compressing a digitised input image signal by 1/n and numeral 232 indicates a front end low pass filter for preventing feedback noise from being generated when the degree of enlargement is large. The numeral 228 is a first switch for controlling the degree of enlargement of the signal compressed by the compression circuit 218 and the signal produced from the low pass filter in accordance with a changeover signal. Also, numeral 8 indicates the memory for the digital signal for the input image changed over to by the switch 228, numeral 10 indicates the write in controller for generating the write in address for writing the applied image signal into the memory 8 from the synchronizing signal and the system clock and numeral 12 indicates the read out controller for reading out the image signal stored in the memory 8 and enlarging it to a predetermined degree. The numeral 220 indicates an expansion circuit for expanding the input signal which was compressed by 1/n n times so as to return it to its original state and numeral 230 indicates a second switch for controlling the degree of expansion of the image signal returned to its original state by the expansion circuit 220 and the signal produced from the memory 8 in accordance with a changeover signal. Further, numeral 21 indicates the interporation processor for performing interpolation on the intermediate image signal for the image from the output of the second switch 230 and numeral 22 indicates a third switch for switching over from the synchronizing signal for the input image signal and the synchronizing signal portion in the image signal for the expanded image which underwent interpolation processing. The numeral 26 indicates a blanking signal generator for generating a blanking signal from synchronizing signal for controlling the third switch and the system clock and numeral 26 indicates a D/A converter for converting the image signal produced from the switch 24 into an analog circuit.

Next, the operation will be described.

If the degree of expansion for the input signal is smaller than a predetermined n times, the compression circuit 218 carries out a compression of 1/n in the same way as in the fourth example of the prior art and this compressed signal is then stored in the memory 8. By carrying out this 1/n compression, the size of the memory can be reduced by 1/n. If the degree to which the input signal is enlarged is greater than n times, the enlarged part of the image signal will only contain less than 1/n of the entire input image signal, if the position of the signal it is desired to expand is known, control can be carried out so that just this image signal can be stored in the memory 8 and the memory will be sufficient even without compressing the input image signal.

According to the example described above, the capacity of the required memory becomes smaller by compressing the input image 1/n times with a compression circuit before storing it in the memory when the image for the applied image signal is to be expanded from one to n times (τn times in the horizontal direction and τn times in the vertical direction). When the degree of enlargement is small, as the amount of information for the source signal is large, even if 1/n compression is carried out by the compression circuit picture degradation caused by this compression becomes more difficult to notice.

On the other hand, when the degree of enlargement becomes greater than n, the necessary signals from within the input image signal for the source make up less than 1/n of the entire input image signal. Control can therefore be carried out so that just the portions of the signal which it is desired to enlarge are written into the memory and the input image signal is not compressed. In this way the capacity of the memory can be kept for storing essential signals and detriments in the picture quality of images caused by compression can be removed.

Also, as the capacity of the memory can be economized on, costs can be reduced and detriments to picture quality can be kept to a minimum.

A description of the image sensing apparatus for these embodiments of this invention will now be given based on FIG. 17.

Here, the numeral 1 indicates the CCD color image sensing element, the image sensing surface of which is made up of minute color filters, numeral 102 indicates the drive pulse generator for driving the CCD1, numeral 103 indicates the standard oscillator made of uniform liquid crystal, numeral 104 indicates the sample/hold circuit for making the output of CCD1 sequential, numeral 105 indicate s the clamping subtractor for carrying out clamping and dc. subtraction on the signal and numeral 106 indicates the image signal processing/focusing circuit.

In this image signal processing/focusing circuit, the numeral 107 indicates an A/D converter, numerals 108 and 109 indicate single horizontal delay circuits for carrying out a delay of one horizontal period and these are made so that their operation will come to a halt upon receiving a delay blanking signal LMBLK which is to be described later. The numeral 110 indicates a low pass filter for obtaining the luminance signal Y, numeral 11 indicates a gamma correction circuit, numeral 112 indicates a color separation circuit for separating the red (R) green (G) and blue (B) color signals from the image sensing signal, numeral 113 and 114 indicate multipliers for using the white balance to vary the gain by the RG and BG signals, numerals 115, 116 and 117 indicate gamma correction circuits and numeral 118 indicates the color difference matrix which is composed of the color difference signals R-Y and BY made up from R, G and B.

The numeral 119 indicates a field memory where the gamma corrected luminance signal Y and the color difference signals R-Y and B-Y are stored in one field portions. Numeral 120 indicates the address controller for controlling the field memory 119, numeral 121 indicates the switch for controlling items such as the address controller 120 and numeral 322 indicates the mode switch for selecting still mode or enlarge mode.

The numerals 123, 324 and 125 indicate changeover switches for changing over between reading out each of the signals Y, R-Y and B-Y and reading out signals from the field memory and are changed over by switching the switch 121 on and off. Numerals 326, 127 and 328 indicate blanking circuits operated by the blanking signal BLK, numeral 129 indicates a D/A converter, numeral 330 indicates an adder which adds the synchronizing signal SYNC and numeral 131 indicates an output terminal.

The numeral 332 indicates a modulator for modulating the subcarrier SC using the color difference signal, numeral 134 indicates a D/A converter, numeral 135 indicates a bandpass filter, numeral 136 indicates an output terminal and numeral 137 indicates a gate for picking out the burst signal by the burst flag BF from the subcarrier SC.

Also, numeral 139 indicates a gate for drawing out the black level period from the image sensing signal using the OBP signal, numeral 140 indicates an integrator and numeral 141 indicates a D/A converter, the output of which becomes a clamp signal.

The numeral 142 indicates the timing signal generator for generating signals such as LMBLK, OBP, BLK, BF, SYNC and SC along with signals such as the horizontal and vertical drive pulses HD and VD. This timing signal generator 142 generates each of the timing signals based on the standard clock MCLK obtained from the drive pulse generator 102 and also takes into consideration the ON/OFF and mode signals from the switches 121 and 122.

Next, the operation will be described.

An objective image passes through an optical system (not shown in the diagram) to be sensed by the image sensing surface of the CCD1. It is converted from an optical signal to an electrical signal and an image sensing image is formed in accordance with a drive pulse generated by the drive pulse generator 102. After this image sensing signal is converted into a sequential signal by the sample/hold circuit 104, it is clamped to a predetermined dc. value by being subtracted from a clamping signal by the subtractor 105 before being applied to the image signal processing/focusing circuit 106.

Here, it is converted to a digital signal by the A/D converter 107. This digital signal is first applied to gate 139 and the optically black portion is pulled out by the OPB signal generated by the timing signal generator 142 for the purpose of pulling out the optically black signal for CCD1. After this black portion of the signal has been integrated by the integrator 140, it is converted to an analog signal by the D/A converter 141. It is then fed back via a feedback loop to the subtractor 105 to be subtracted from the image sensing signal and acts as a clamping signal so that the dc. level is kept constant.

Also, the output from the A/D converter 107 is applied to the single horizontal delay circuits 108 and 109. These single horizontal delay circuits 108 and 109 are for preventing occurrences such as the leaking in of the drive pulse for CCD1 during the horizontal line return period. The image signal for periods when the delay line blanking signal LMBLK is not being applied is stored and after a delay of a single horizontal pass, an un-delayed signal, a signal delayed by a single horizontal pass and a signal delayed by two horizontal passes are formed at the output. The signal delayed by a single horizontal pass has its color carrier component removed by the low pass filter 110 and then becomes the luminance signal Y after undergoing gamma correction performed by the gamma correction circuit 111. This signal Y is then applied to the field memory 119 and the switch 123.

The un-delayed signal, the signal delayed by one horizontal pass and the signal delayed by two horizontal passes are then sent to the color isolation circuit 112 where they are separated into R, G and B signals. After the gain of the R and B signals has been modified by the multipliers 113 and 114 respectively and white balance adjustment has been carried out, gamma correction is carried out on the respective signals by the gamma correction circuits 115, 116 and 117. Then, after having been converted into color difference signals R-Y and B-Y by the color difference matrix 118, these signals are applied to the field memory 119 and the switches 324 and 125.

When the switch 121 is on, the field memory 119 operates the address signal generated by the address controller 120 and the control signal in accordance with the mode set up by the mode switch 322. For example, when the mode switch 322 is in the position a, the input signal is held without modification so as to give a still effect. Also, when the mode switch 322 is in the b position, a predetermined portion of the input signal is read in and the enlargement of the picture is carried out carrying out interporation while reading out. The on/off outputs for switches 121 and 322 and the mode output are also applied to the timing signal generator circuit 142 to be used for adjusting the timing of each of the timing pulses such as BF, BLK and SYNC.

The switches 123, 324 and 125 are controlled by the switch 121. When the switch 121 is off, the equipment is in normal mode and the signals Y, R-Y and B-Y are connected directly without passing via the field memory 119. Also, when the switch 121 is on, the signal read out from the field memory 119 is produced These signals then undergo blanking processing applied by the signal BLK via their respective blanking circuits 326,127 and 328. After the luminance signal Y has been converted into an analog signal by the D/A converter 129 it is added with the synchronizing signal SYNC by the adder 330 to be produced from output terminal 131 as the luminance signal Y.

Further, the signals R-Y and B-Y are modulated from the subcarrier SC by the modulator 332. This modulated signal is then added to the burst signal which was gated by the burst flag signal BF at the gate 137 by the adder 133. After this signal has been converted to an analog signal by the D/A converter 134, a predetermined modulated color signal band is taken out of it by the band pass filter 135 and this is produced from the output terminal 136 as the chrominance signal.

On the other hand, after the clock generated by the standard oscillating element 103 has been divided by the drive pulse generator 102 it is applied to the timing signal generator 142 as the standard clock MCLK and this timing signal generator then generates each timing signal based on this standard clock MCLK. By also generating a horizontal drive pulse and a vertical drive pulse for inputting to the drive pulse generating circuit, it's operation can be synchronized with that of the CCD1.

Figure 18:
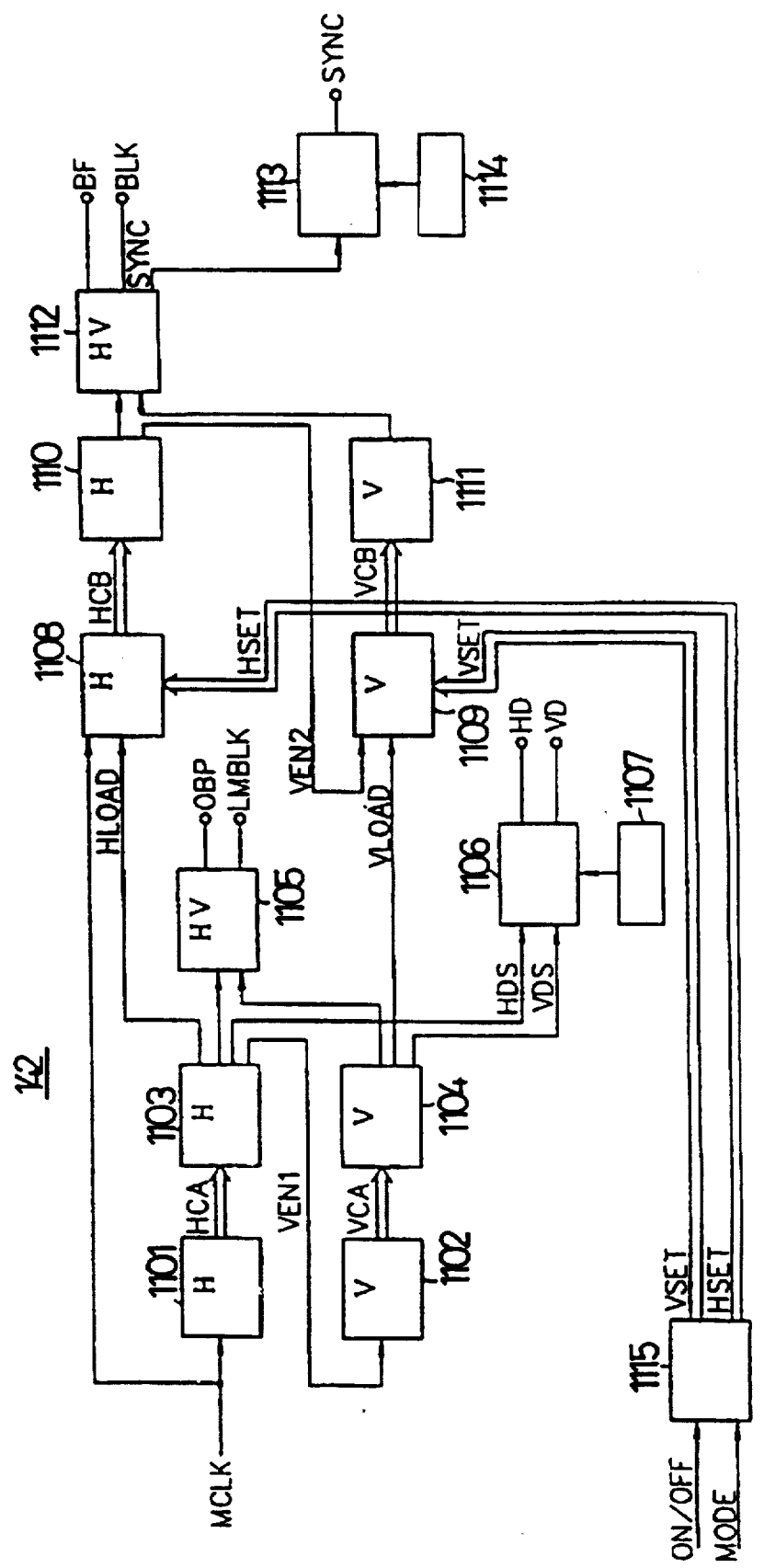
FIG. 18 is a block diagram of the structure of the timing signal generator present in the structure in FIG. 17.

FIG. 18 is a view of an embodiment of the timing signal generator 142 for the embodiments.

Figure 17:
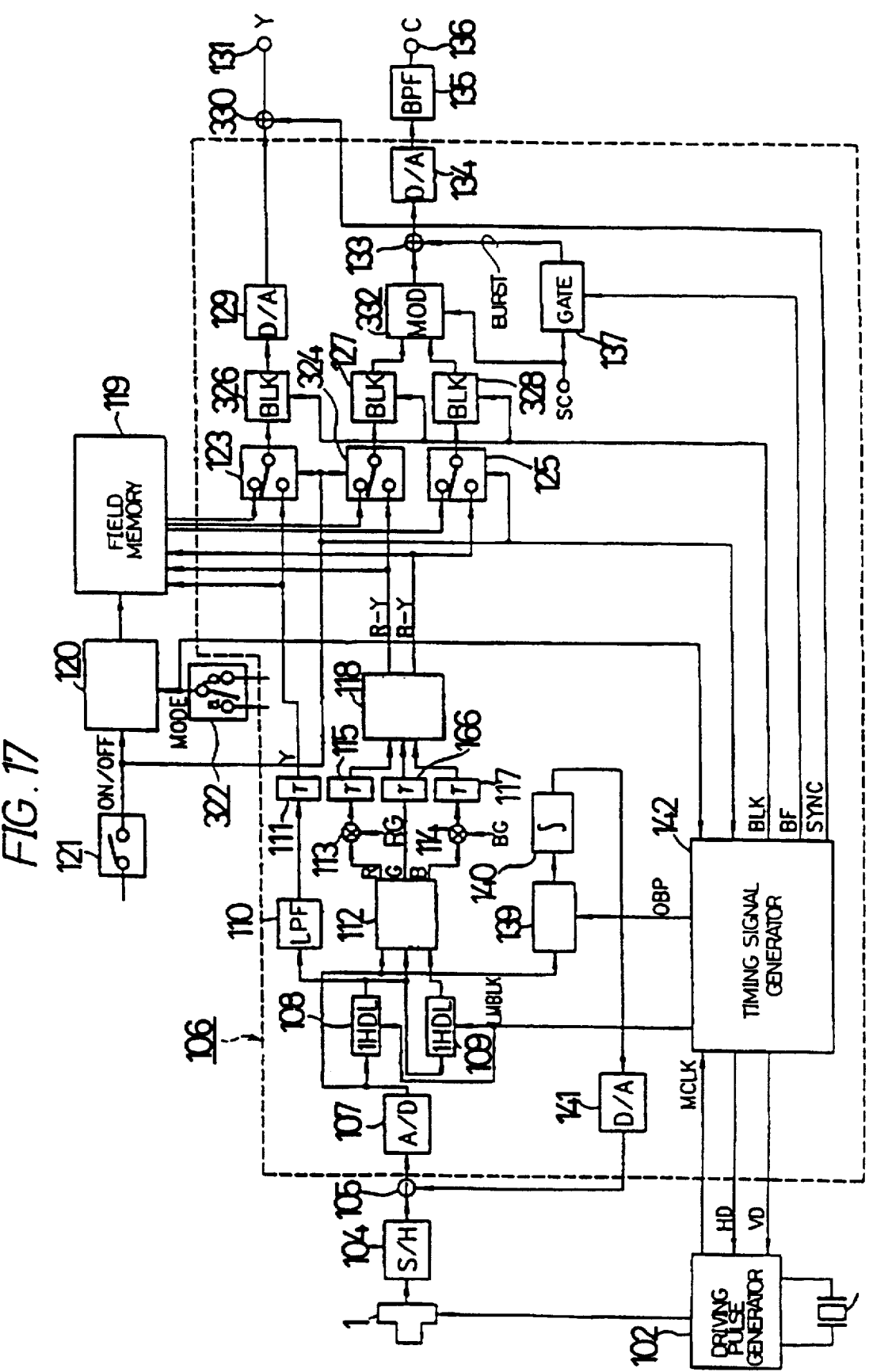
FIG. 17 is a block diagram of the structure of an image sensing apparatus for this seventh embodiment of the invention.

In this diagram, the numerals 1101 and 1108 indicate H (horizontal) counters into which the standard clock MCLK is applied, numerals 1102 and 1109 indicate V (vertical) counters, numerals 1103 and 1110 indicate H decoders, numerals 1104 and 1111 indicate V decoders, numerals 1105 and 1112 indicate HV (horizontal and vertical) decoders, numerals 1106 and 1113 indicate delay circuits, numerals 1107 and 1114 indicate registers with predetermined values written in, and numeral 1115 indicates a decoder for generating a control value corresponding to the on/off and mode signal values applied from the switches 121 and 322 shown in FIG. 17.

Next, the operation of the above construction will be described.

The H counter 1101 performs a computation on the standard clock MCLK provided by the pulse drive generator 102. A computed value HCA is then decoded by the decoder 1103 and each of the various horizontal system pulses are generated. First, a single signal VEN1 for a single horizontal period is generated. A computation is then carried out on this signal VEN1 by the V counter 1102, a calculated value VCA is decoded by the V decoder 1104 and each of the various vertical system pulses are generated.

Also, the decoder 1103 generates a signal HDS and the V decoder 1104 generates a signal VDS. These are delayed by he delay circuit 1106 by an amount corresponding to the value set up in the register 1107 before being sent to as the signals HD and VD to the drive pulse generator 102. Also, by applying one part of each of the outputs from the H decoder 1103 and the V decoder 1104 to the HV decoder 1105, the signals OBP and LMBLK for the HV composite timing pulse can be generated and these are sent to the gate 139 and the and the 1H delay circuits 108 and 109 respectively.

Further, a load pulse H LOAD for the H counter 1108 is generated at the decoder 1102 and a load pulse V LOAD for the V counter 1109 is generated at the decoder 1104. If a load pulse V LOAD is applied at the H counter 1108, the value for H SET calculated in accordance with the on/off and mode state of the switches 121 and 322 is loaded, after which a computation is carried out on the standard clock MCLK. In the same way, if a load pulse V LOAD is applied at the V counter 1109, the value for VSET generated at the decoder 1115 is loaded, after which the signal VEN2 generated by the H decoder 1110 in accordance with the computated value HCB for the H counter 1108 is computated.

The values HCB and VCB computated at the H counter 1108 and the V counter 1109 are applied to the H decoder 1110 and the V decoder 1111, the outputs from which are applied HV decoder 1112 and the BF, BLK and SYNCS signals for the HV composite timing pulse are generated. The signals BF and BLK are then provided to the gate 137 and the blanking circuits 326, 127 and 328 respectively. Also, the SYNCS signal is sent to the adder 133 after it has been delayed in accordance with the value set in the register 1114 by the delay circuit 1113.

Here, regular predetermined values are written into the registers 1107 and 1114. However, the construction is such that if shifts occur in the timing during, for example, exchanges between the image sensing elements 1 and the band pass filter 135, these timing shifts can be compensated for by re-writing the value with an adjusted value.

FIG. 19 is a timing part describing one part of the operation described above.

In FIG. 19:

(a) shows the horizontal drive pulse HD, (b) shows the output of the switch 123 when the switch 121 is off; and (c) shows the output of the switch 123 when the switch 121 is on, the switch 322 is in the b position with the mode switch in the picture enlarging mode. The part from A to B in (b) is shown expanded as the part from C to D in (c). At this time, as the signal occurring at the position A in (b) is the signal (c) for reading out the signal written in the for special effects read out from a field memory and a normal signal, and by setting up a timing modification means for the timing signals necessary in the following processes, shifts in the timing of the signal can be compensated for using a simple construction regardless of whether special effects such as stilling or enlarging are on or off and a compact, high resolution image sensing apparatus can therefore be constructed.

Also, according to this embodiment, by having a construction where the amount of delay between the horizontal and vertical synchronizing signals and the drive pulses can be varied, even if shifts in the timing occur during exchanges between parts of the equipment such as, for example, the image sensing element and the band pass filter, by rewriting the values in items such as the registers, adjustment may be performed easily with a simple construction so that complicated adjusting equipment will no longer be necessary.

According to each of the embodiments described above, an image enlarging/processing apparatus has been provided in which detrimental effects to the image which accompany image enlargement processing have been reduced.

What is claimed is:

1. An image signal processing apparatus for processing an input image signal, comprising:
   (a) image storing means for storing a first image signal and for reading out the stored first image signal;
   (b) indicating means for indicating an expansion degree;
   (c) compressing means for compressing said input image signal in accordance with said expansion degree indicated by said indicating means to produce a compressed input image signal;
   (d) expanding means for expanding the stored first image signal read out from said image storing means in accordance with said expansion degree indicated by said indicating means to produce an expanded image signal;
   (e) interpolation processing means for interpolation processing the stored first image signal or said expanded image signal to produce an interpolated image signal;
   (f) first switching means for switching said input image signal and said compressed input image signal so that, when said expansion degree is less than n, said compressed input image signal is supplied to said image storing means as said first image signal, and when said expansion degree is greater than or equal to n, said input image signal is supplied to said image storing means as said first image signal; and
   (g) second switching means for switching the stored first image signal and said expanded image signal so that, when said expansion degree is less than n, said expanded image signal is supplied to said interpolation processing means, and when said expansion degree is greater than or equal to n, the stored first image signal is supplied to said interpolation processing means.

2. An image signal processing apparatus according to claim 1, wherein the image signal includes an interlaced image signal with the image signal for a single frame being made up of an odd field image signal and an even field image signal, and the image signal may be stored in single frame portions.

* * * * *

UNITED STATES PATENT AND TRADEMARK OFFICE
CERTIFICATE OF CORRECTION

PATENT NO. : 5,781,244

DATED : July 14, 1998

INVENTOR(S) : Hisataka Hirose, et al.

It is certified that error appears in the above-identified patent and that said Letters Patent is hereby corrected as shown below:

Column 1, line 42, change "interporation" to --interpolation--.

Column 16, line 62, after "signal written in the" insert

--field memory 119, it is delayed by a period of time from E to C; and (d) shows the synchronizing signal SYNC (here, this is a horizontal synchronizing signal) occurring in the operation in (b); and (e) is a view of the synchronizing signal during the enlargement operation in (c).

FIG. 20 is a view of a television picture. Here, the frame F shows the normal picture size and sloping lines within the frame G shows the size of the image to be expanded during image expansion. The position at which the normal picture starts in the vertical direction is indicated by H and the position at which it starts during expanding is indicated by I. The vertical synchronizing signal is therefore only shifted by the portion H-I.

Predetermined values VSET and HSET corresponding to shifts in the timing signals by the modes are generated by the decoder 1115. By loading these values into the H counter 1108 and the V counter 1109, timing pulses such as BLK, BF and SYNC can be generated in a manner which is suitable to the mode.

The same case also applies if the field memory 119 in this embodiment is only used for carrying out processing in the horizontal direction.

It therefore follows that by selecting between a signal--

Signed and Sealed this

Third Day of August, 1999

Attest:

Q. TODD DICKINSON

*Attesting Officer*         *Acting Commissioner of Patents and Trademarks*